(12) United States Patent  
Tan

(10) Patent No.: US 8,103,610 B2  
(45) Date of Patent: Jan. 24, 2012

(54) DYNAMIC CATEGORIZATION OF RULES IN EXPERT SYSTEMS WHEREIN A PROFILE DEFINITION YIELDS CLASSIFICATION DATA THAT CLASSIFIES RULES AND ALLOWS FOR RULES TO BE SEARCHABLE

(75) Inventor: It-Beng Tan, Redwood City, CA (US)

(73) Assignee: Computer Associates Think, Inc., Islandia, NY (US)

(*) Notice: Subject to any disclaimer, the term of this patent is extended or adjusted under 35 U.S.C. 154(b) by 908 days.

(21) Appl. No.: 12/130,451

(22) Filed: May 30, 2008

(65) Prior Publication Data

US 2009/0299950 A1    Dec. 3, 2009

(51) Int. Cl.  
*G06F 17/00* (2006.01)

(52) U.S. Cl. ......................................................... 706/47

(58) Field of Classification Search .............. 706/45–48; 707/665, 694, 706  
See application file for complete search history.

(56) References Cited

U.S. PATENT DOCUMENTS

| | | | |
|---|---|---|---|
| 7,003,578 B2* | 2/2006 | Kanada et al. | 709/230 |
| 2001/0014150 A1* | 8/2001 | Beebe et al. | 379/189 |
| 2002/0147726 A1* | 10/2002 | Yehia et al. | 707/101 |
| 2003/0177118 A1* | 9/2003 | Moon et al. | 707/5 |
| 2004/0117765 A1* | 6/2004 | Chan | 717/117 |
| 2006/0036448 A1* | 2/2006 | Haynie et al. | 705/1 |
| 2006/0179058 A1* | 8/2006 | Bram et al. | 707/9 |
| 2008/0273224 A1* | 11/2008 | Maulsby et al. | 358/1.15 |

* cited by examiner

*Primary Examiner* — David Vincent  
(74) *Attorney, Agent, or Firm* — Schwegman, Lundberg & Woessner, P.A.

(57) ABSTRACT

Various embodiments include one or more of systems, methods, software, and data structures for dynamic categorization of rules and collections of rules within a rule base, such as a rule base of an expert system. One embodiment provides a computerized method that includes receiving a selection of one or more identifiers of rules in an expert system rule base and receiving a profile definition, the profile definition including metadata, which when processed, yields classification data that classifies the rules in the expert system rule base of the one or more selected rule identifiers. This computerized method further includes storing the profile definition with an association to the one or more selected rule identifiers of rules in the expert system rule base.

15 Claims, 5 Drawing Sheets

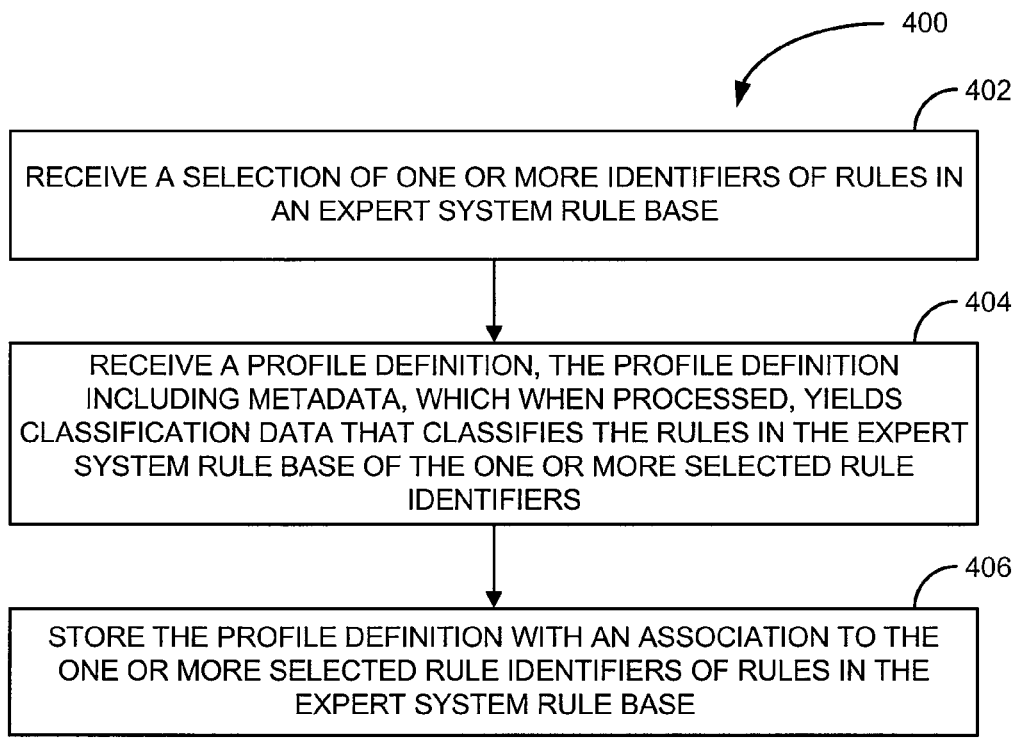

| PROFILE | RULE | PROFILE TYPE | CODE | DESC | VALUE |
|---|---|---|---|---|---|
| A | QTR_RSLT | INFER | CODE SEG | INFER RESULTS | |
| B | ProdAvail | CODE HNDL | CODE REF | PROD AVAILABLE | |
| C | SALES | REFERENCE | QUERY | SALES QUERY | |
| D | ASSIGN | REF DESTINATION | EXT CALL | ASSIGNMENTS | |

FIG. 3

400
402 — RECEIVE A SELECTION OF ONE OR MORE IDENTIFIERS OF RULES IN AN EXPERT SYSTEM RULE BASE

404 — RECEIVE A PROFILE DEFINITION, THE PROFILE DEFINITION INCLUDING METADATA, WHICH WHEN PROCESSED, YIELDS CLASSIFICATION DATA THAT CLASSIFIES THE RULES IN THE EXPERT SYSTEM RULE BASE OF THE ONE OR MORE SELECTED RULE IDENTIFIERS

406 — STORE THE PROFILE DEFINITION WITH AN ASSOCIATION TO THE ONE OR MORE SELECTED RULE IDENTIFIERS OF RULES IN THE EXPERT SYSTEM RULE BASE

FIG. 4

DYNAMIC CATEGORIZATION OF RULES IN EXPERT SYSTEMS WHEREIN A PROFILE DEFINITION YIELDS CLASSIFICATION DATA THAT CLASSIFIES RULES AND ALLOWS FOR RULES TO BE SEARCHABLE

BACKGROUND INFORMATION

Expert systems are often used to solve problems in fields involving large number of interacting rules. An example of expert system could be a medical system specifying the symptoms of a patient with possible diagnoses. The collection of rules called a rule base, or also referred to as a knowledge base, is typically written by domain specialists, such as doctors, working in conjunction with knowledge engineers. Integrated development tools, software lifecycle tools, and database tools are used to help manage and control rules and collections of rules at various stages of development. Most of these tools are designed for the development of other types of software module such as application software, database applications, and services.

For complex and wide deployment of rule bases in expert systems, more advanced and specialized rule bases often evolve from the initial versions. Such proliferation of rule bases entails corresponding complexity in the supporting tools to manage, search, sort, compare, categorize, and audit rules and collections of rules. Metadata such as keywords, annotation, versioning, and other edit-time and static-time properties can be attached to aid in these tasks. However, such metadata fails to take into account property values that are dynamic in nature. For example, property values that depend on the values of rule base fields that are inferred from a subset of the rules in the rule base or computed through external code resources and web services.

SUMMARY

Various embodiments include one or more of systems, methods, software, and data structures for dynamic categorization of rules and collections of rules within a rule base, such as a rule base of an expert system. One embodiment provides a computerized method that includes receiving a selection of one or more identifiers of rules in a rule base and receiving a profile definition, the profile definition including metadata, which when processed, yields classification data that classifies the rules in the rule base of the one or more selected rule identifiers. This computerized method further includes storing the profile definition with an association to the one or more selected rule identifiers of rules in the rule base.

Another embodiment takes the form of a system and includes a processor and at least one memory device coupled to a bus. The system in such embodiments further includes one or more databases holding a rule base of rules and a profile database of profiles including rule classification profiles to classify rules of the rule base. The system also includes rule base development and management software held in the at least one memory device and executable by the processor to receive a rule query against the rule base, to execute the rule query to identify rules in the rule base as a function of the rule classification profiles, and to provide a result set of identified rules.

BRIEF DESCRIPTION OF THE DRAWINGS

FIG. 3 is a data structure diagram according to an example embodiment.

FIG. 4 is a block flow diagram of a method according to an example embodiment.

DETAILED DESCRIPTION

Figure 1:
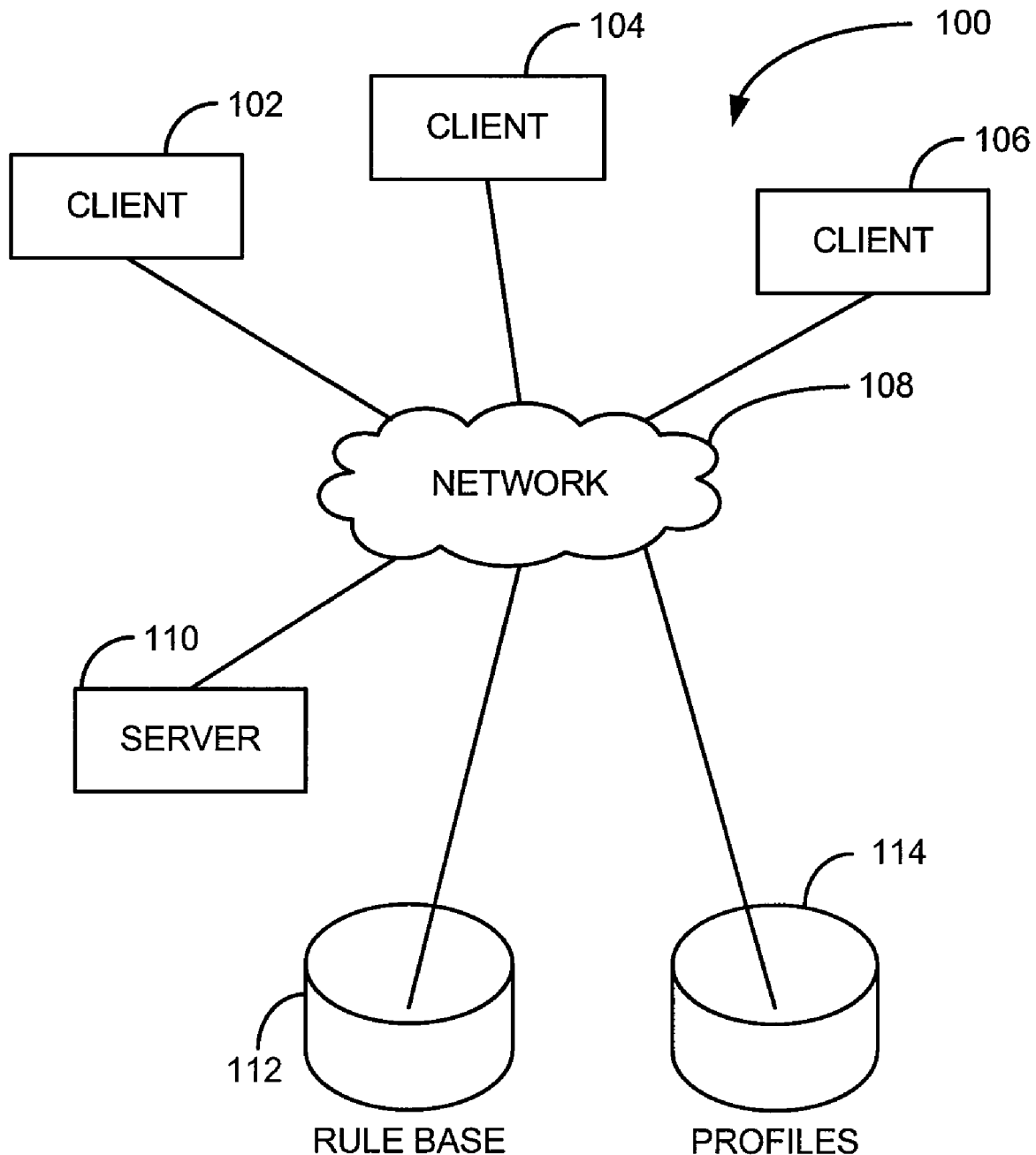
FIG. 1 is a block diagram of a networked computing environment according to an example embodiment.

Various embodiments herein include one or more of systems, methods, software, and data structures for dynamic categorization of rules and collections of rules within a rule base, such as a rule base of an expert system. Some such embodiments include metadata, referred to here in as a profile. A profile typically includes executable or interpretive code, queries, external calls to Application Programming Interfaces (API), web services, and the like, and other forms of metadata which may be associated with one or more of rules, rule variants, collections of rules, and rule bases. Profiles, when accessed and executed, provide dynamic data to classify the one or more rules, rule variants, collections of rules, and rule bases. As a result, dynamic searching for rules is facilitated based on changing conditions within an organization employing an expert system including one or more of rules, rule variants, collections of rules, and rule bases with associated profiles. The changing conditions may be fueled by market conditions, staffing changes, product availability, other changing conditions, and even passing of time, such as moving from annual quarter to annual quarter. Various example embodiments are described below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a networked computing environment 100 according to an example embodiment. The networked computing environment 100 includes one or more clients 102, 104, 106 that communicate with a server 110 and one or more databases 112, 114 over a network 108. The clients 102, 104, 106, in some embodiments, may be virtually any type of computing device, such as personal computers, handheld computing devices, and other similar devices. In other embodiments, the clients 102, 104, 106 are applications that communicate over the network 108, such as web browsing applications. The network 108 is a system which allows data to be exchanged between the clients 102, 104, 106, the server 110, and the databases 112, 114. The network may include one or more of a local area network, a wide area network, a storage area network, the Internet, and other network types. The connections to the network 108 may include wired, wireless, optical, and other connections types that facilitate data communication over the network 108.

The databases 112, 114 maybe one or more data stores such as databases, files, or other persistent media or data structures. The databases 112, 114 may be resident on the server 110, one or more of the clients 102, 104, 106, or on dedicated database host computing devices. The databases 112, 114 include a rule base database 112 and a profiles database 114. The rule base database 112 includes rules that are operable within an expert system for making decisions. The profiles database 114 includes profiles associated with one or more rules in the rule base database 112 that may be evaluated to identify rules meeting certain criteria.

A profile in the profiles database 114 includes metadata that may be processed to identify one or more properties of a particular rule in the rule base 112 to which the profile is associated. The metadata may include executable code that may be processed to infer or otherwise calculate a property or a likely outcome of the rule to which the profile is associated. The metadata may also, or alternatively, include a call to an external process, such as an API call, web service call, a database stored procedure call, or other process that returns a value that may be used to classify the one or more rules to which a profile may be associated.

As mentioned above, the data that may be derived by processing profiles is used in various embodiments to obtain data that may be used to classify rules. Due to the programmatic nature by which profiles may be defined, classification based on such data is dynamic to changing data conditions. For example when a profile is associated with a rule that is defined within an expert system to make decisions based on financial data, the profile may programmatically derive a value to classify one or more rules based on current financial data. Thus, as the financial data, such as data from recent sales or account balances, changes, classification of rules to which a profile is associated may also change.

In some embodiments, client 102, 104, 106 users may create, read, update, and delete rules and profiles stored in the databases 112, 114. In some embodiments, the clients 102, 104, 106 may directly access the databases 112, 114, such as through use of a rule and profile authoring application resident on the clients 102, 104, 106. In other embodiments, the clients 102, 104, 106 may access the databases 112, 114 via the server 110, such as in a web-based embodiment. In such embodiments, the server 110 may include one or more of a web server and an application server process configured to perform various rule and profile functions. In either type of embodiment, either the server 110 or the client 102, 104, 106 resident applications may include an inference engine that is operative to process profiles in the profiles database 114 to obtain data to classify associated rules stored in the rule base 112. In some embodiments, the processing of profiles is performed upon receipt of a rule query from a client 102, 104, 106. In other embodiments, the processing of profiles is performed as a batch process. Batch processing of profiles may be performed on an ad hoc basis or on a periodic basis, such as nightly, monthly, quarterly, or other recurring basis. The profile processing may involve all profiles or less than all profiles. Some profiles may be processed at different times that other profiles.

Figure 2:
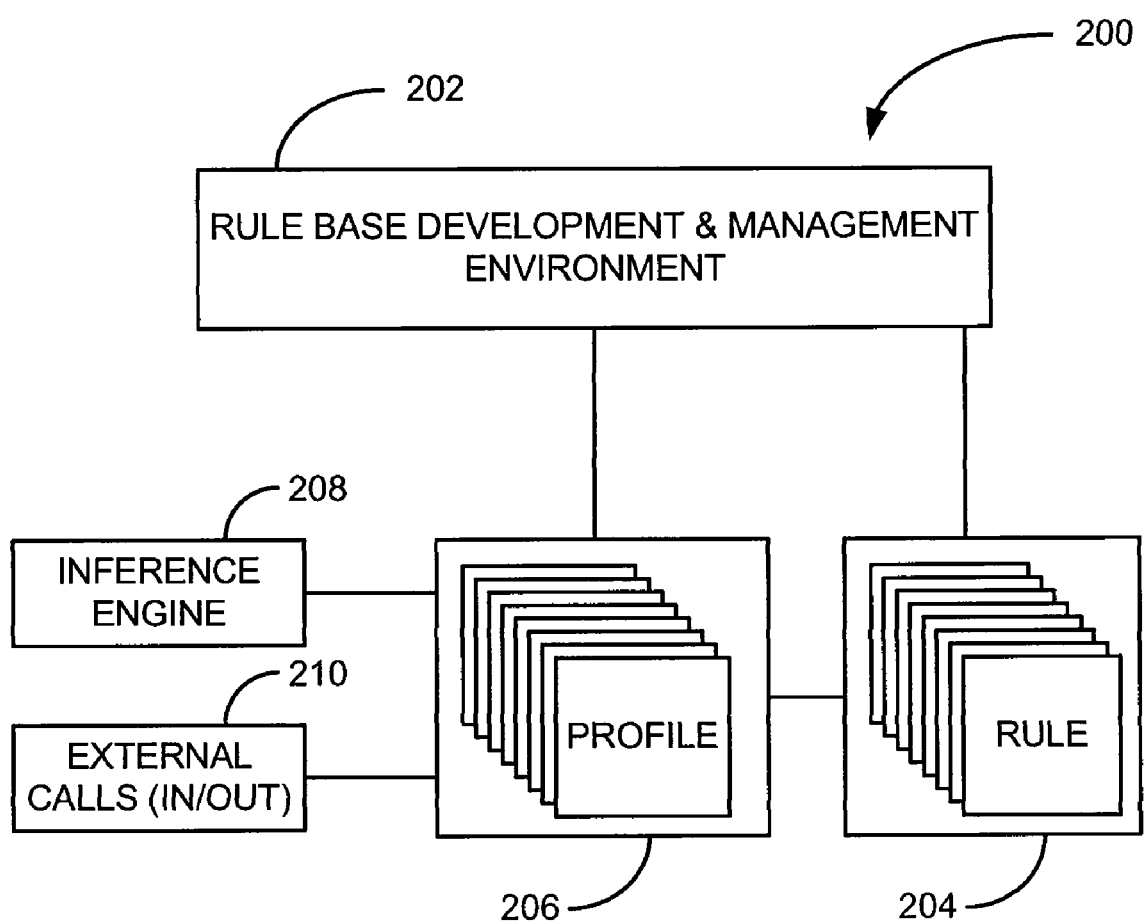
FIG. 2 is a logical block diagram of a system according to an example embodiment.

FIG. 2 is a logical block diagram of a system 200 according to an example embodiment. The system 200 provides a logical perspective of how rules of a rule base 204 and profiles of a profile database 206 are associated and the environment within which they exist. The system 200 includes a rule base development and management environment 202, a rule base 204, and a profile database 206. The rule base development and management environment 202 in some embodiments is a development and management environment of an expert system. The development and management environment is in contrast to a runtime environment within which rules of an expert system are used to make decisions.

The profile database 206 includes profiles that may be associated with one or more rules in the rule base 204, or with the rule base itself. Some profiles may include code that may be executable within an inference engine 208 that is part of the expert system. Other profiles may include external calls 210 to external processes, such as other applications, databases, other systems, and the like. The external calls 210 may include API calls, calls to web services, queries of other databases, and the like.

FIG. 3 is a data structure 300 diagram according to an example embodiment. The data structure 300 is an example of a table that may hold profiles in a profile database. The example data structure 300 is in the form of a table and includes columns of data fields and rows of data. The columns include PROFILE which is a unique identifier for each profile record. The columns also include RULE which includes data identifying a rule to which a profile record is associated. Further columns include PROFILE TYPE, CODE, DESC (description), and VALUE.

The PROFILE TYPE column is included in some embodiments, which may also include other similar columns, to provide a mechanism for searching, sorting, and classifying profiles. The PROFILE TYPE column in the illustrated example data structure 300 is included to identify how each profile record value is calculated by the CODE column. This may include, for example, an inference code segment, a code handle that references code stored in a particular location, a reference to one or more records or a stored procedure in a database or other storage location, an external call as described above, or other types depending on the particular embodiment.

The CODE column includes the code, call, reference, or other data that may be used to generate a value to classify the rule of the respective profile record. The VALUE column holds a value generated as a function of the data in the CODE column. The DESC column holds a description of the profile of a respective profile record. More or fewer columns may exist in such a data structure 300 in other embodiments.

FIG. 4 is a block flow diagram of a method 400 according to an example embodiment. The method 400 is an example method of defining a profile that may be processed to obtain a value that is useful in classifying a rule, collection of rules, or a rule base. The method 400 includes receiving 402 a selection of one or more identifiers of rules in an expert system rule base. The selection may be made in a user interface that presents a listing of rules, rule collections, or rule bases. The method 400 further includes receiving 404 a profile definition, the profile definition including metadata, which when processed, yields classification data that classifies the rules in the expert system rule base of the one or more selected rule identifiers. The method 400 further includes storing 406 the profile definition with an association to the one or more selected rule identifiers of rules in the expert system rule base.

In some embodiments, the metadata of the profile definition may include a code segment that is executable to produce the classification data. The metadata of the profile definition may include a call to an external process to obtain the classification data. Such external calls, as noted above, may include a call to one or more of a web service, an API, a stored procedure, a process on a server, or other process.

Figure 5:
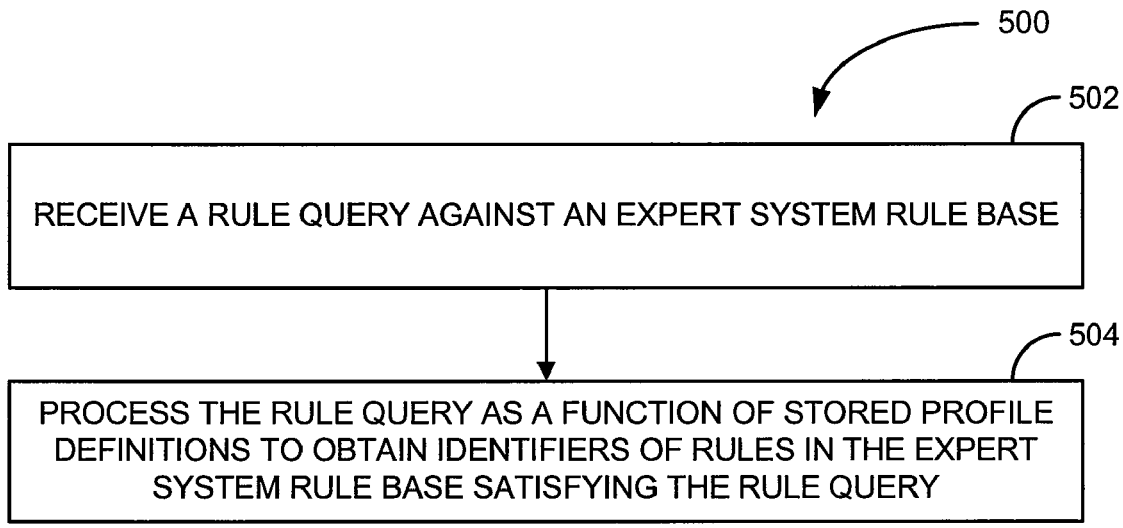
FIG. 5 is a block flow diagram of a method according to an example embodiment.

FIG. 5 is a block flow diagram of a method 500 according to an example embodiment. The method 500 is an example method of performing a search against a rule base using profiles associated with rules. The method 500 includes receiving 502 a rule query against an expert system rule base. The method further includes processing 504 the rule query as a function of stored profile definitions to obtain identifiers of rules in the expert system rule base satisfying the rule query. Processing 504 the rule query as a function of the stored profile definitions, in some embodiments, includes processing code portions of at least a subset of profile definitions to generate a classification value of each profile of the portion of profile definitions. In other embodiments, such values have already been generated based on the code portions and may simply be retrieved. In either case, the processing 504 of the rule query may then be performed against these values to obtain the identifiers of the rules satisfying the rule query.

Figure 6:
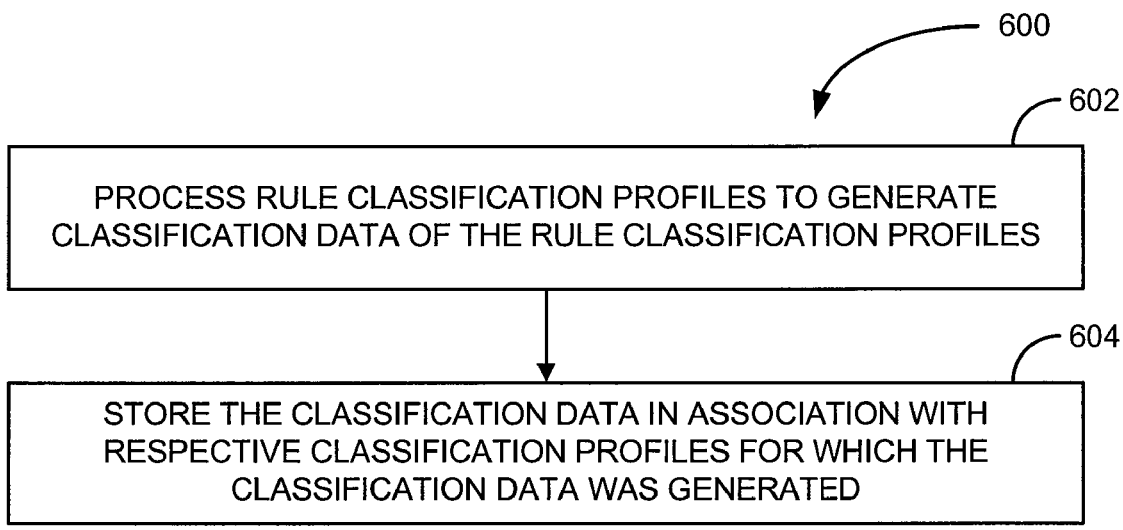
FIG. 6 is a block flow diagram of a method according to an example embodiment.

FIG. 6 is a block flow diagram of a method 600 according to an example embodiment. The method 600 is an example method of processing code portions of profiles in a profile database to generate classification data. The method 600 includes processing 602 rule classification profiles to generate classification data of the rule classification profiles. The method 600 further includes storing 604 the classification data in association with respective classification profiles for which the classification data was generated. The storing 604 may include storing the generated value for each profile in a column of a profile record, as is illustrated and described with regard to FIG. 3. However, the values may alternatively be held in whole or in part in a temporary data structure in a memory of a computer performing the method 600. In other embodiments, a child table of a table holding profiles may hold values generated according to the code portion of respective profiles. The generated values may be stored in other fashions depending on the requirements of the particular embodiment.

As a result of the methods 400, 500, and 600, of FIG. 4, FIG. 5, and FIG. 6, respectively, a profile may be defined, rules identified as a function of profiles, and profile values populated to classify rules. These example embodiments and other embodiments including modifications and extension of these methods may be implemented on one or more computing devices, such as is illustrated in FIG. 7.

Figure 7:
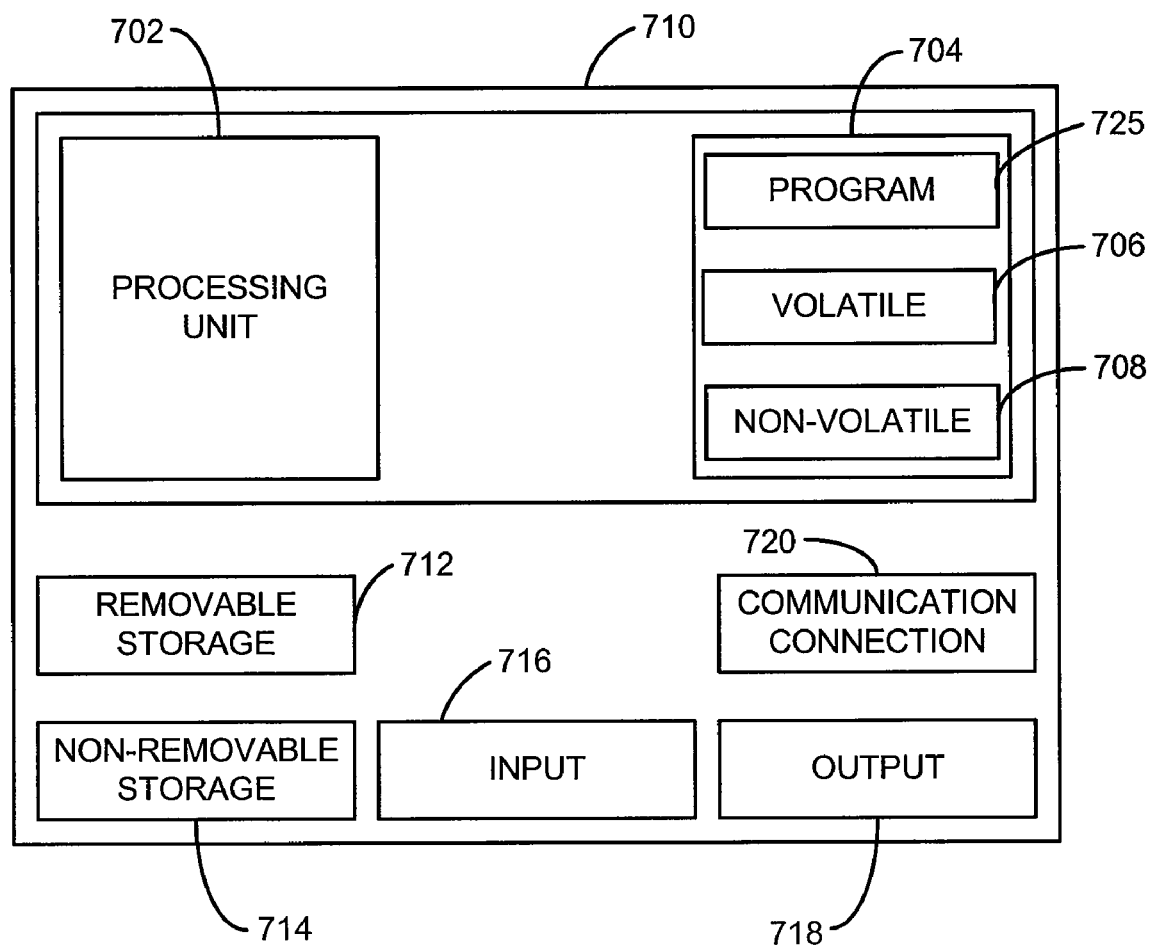
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers, web servers, application servers, and other servers and computing devices. The remote computer may include a personal computer (PC), server, router, network PC, a peer device or other common network node, or the like. The communication connection may include one or more of a Local Area Network (LAN), a Wide Area Network (WAN), a System Area Network (SAN), the Internet, and other networks.

Computer-readable instructions stored on a computer-readable medium are executable by the processing unit 702 of the computer 710. A hard drive, CD-ROM, and RAM are some examples of articles including a computer-readable medium. The term "computer readable medium" is used to medium capable of holding and/or distributing software. For example, a computer program 725 that may implement one or more of the embodiments described herein.

A further embodiment may be in the form of a system. Such a system may include a processor and at least one memory device coupled to a bus. The system also includes one or more databases holding a rule base of rules and a profile database of profiles including rule classification profiles to classify rules of the rule base. The rule base and the profile may be manipulated and accessed through rule base development and management software.

The rule base development and management software is held in the at least one memory device and executable by the processor. In some embodiments, the rule base development and management software is executable to receive a rule query against the rule base, execute the rule query to identify rules in the rule base as a function of the rule classification profiles, and to provide a result set of identified rules.

The rule base development and management software may be further executable to receive a selection of one or more identifiers of rules in the rule base and receive a rule profile definition, the rule profile definition including metadata, which when processed, yields classification data that classifies the rules in the rule base of the one or more selected rule identifiers. In such embodiments, the rule base development and management software is further executable to store the rule profile definition with an association to the one or more selected rule identifiers of rules in the rule base.

Some such system embodiments also include profile software. The profile software is held in the at least one memory device and executable by the processor to process rule classification profiles to generate classification data of the rule classification profiles and store the classification data in association with respective classification profiles for which the classification data was generated. In some embodiments, executing the rule query to identify rules in the rule base as a function of the rule classification profiles includes executing the rule query against the classification data of the rule classification profiles.

What is claimed is:

1. A computerized method comprising:
   receiving a selection of one or more identifiers of rules in an expert system rule base;
   receiving a profile definition, the profile definition including metadata, the metadata including one of an executable code segment or a call to an external process which when processed, yields classification data that classifies the rules corresponding to the one or more selected rule identifiers; and
   storing the profile definition with an association to the one or more selected rule identifiers of rules in the expert system rule base, the profile definition providing searchable rule classification data for rules of the associated rule identifiers.

2. The computerized method of claim 1, wherein the call to an external process includes a web service call.

3. The computerized method of claim 1, wherein receiving the selection of the one or more rule identifiers of rules in the expert system rule base includes receiving a selection of a collection of rules.

4. The computerized method of claim 1, wherein the profile is stored in a profile database.

5. The computerized method of claim 1, further comprising:
   receiving a rule query against the expert system rule base;
   processing the rule query as a function of stored profile definitions to obtain identifiers of rules in the expert system rule base satisfying the rule query.

6. A system comprising:
   a processor coupled to a bus;
   at least one memory device coupled to the bus;
   one or more databases holding a rule base of rules and a profile database of profiles including rule classification profiles to classify rules of the rule base; and
   rule base development and management software held in the at least one memory device and executable by the processor to:
     receive a rule query against the rule base;
     execute the rule query to identify rules in the rule base as a function of the rule classification profiles, at least one rule classification profile including one of an executable code segment or a call to an external process which when executed yields classification data that classifies one or more rules associated with the respective rule classification profile; and
     provide a result set of identified rules.

7. The system of claim 6, further comprising:
   profile software held in the at least one memory device and executable by the processor to:
     process rule classification profiles to generate classification data of the rule classification profiles; and
     store the classification data in association with respective classification profiles for which the classification data was generated.

8. The system of claim 7, wherein executing the rule query to identify rules in the rule base as a function of the rule classification profiles includes executing the rule query against the classification data of the rule classification profiles.

9. The system of claim 6, wherein the external process is a process that executes on a remote computing device and is accessible over a network interface of the system.

10. The system of claim 6, wherein the rule base development and management software held in the at least one memory device is further executable by the processor to:
    receive a selection of one or more identifiers of rules in the rule base;
    receive a rule profile definition, the rule profile definition including metadata, the metadata including one of an executable code segment or a call to an external process which when processed, yields classification data that classifies the rules in the rule base of the one or more selected rule identifiers; and
    store the rule profile definition with an association to the one or more selected rule identifiers of rules in the rule base, the profile definition providing searchable rule classification data for rules of the associated rule identifiers.

11. A computer-readable medium, with instructions thereon, which when processed, cause a computer to:
    receive a selection of one or more identifiers of rules in an expert system rule base;
    receive a profile definition, the profile definition including metadata, the metadata including one of an executable code segment or a call to an external process which when processed, yields classification data that classifies the rules corresponding to the one or more selected rule identifiers; and
    store the profile definition with an association to the one or more selected rule identifiers of rules in the expert system rule base, the profile definition providing searchable rule classification data for rules of the associated rule identifiers.

12. The computer-readable medium of claim 11, wherein the call to an external process includes a web service call.

13. The computer-readable medium of claim 11, wherein receiving the selection of the one or more rule identifiers of rules in the expert system rule base includes receiving a selection of a collection of rules.

14. The computer-readable medium of claim 11, wherein the profile is stored in a profile database.

15. The computer-readable medium of claim 11, including further instructions, which when processed, cause a computer to:
    receive a rule query against the expert system rule base;
    process the rule query as a function of stored profile definitions to obtain identifiers of rules in the expert system rule base satisfying the rule query.

* * * * *